United States Patent
Miyashita

[19]

[11] Patent Number: 5,924,747
[45] Date of Patent: Jul. 20, 1999

[54] COUPLING FOR USE WITH CONTAINER VALVE

[75] Inventor: Naoya Miyashita, Tokyo, Japan

[73] Assignee: Sanko Kogyo Co., Ltd., Tokyo, Japan

[21] Appl. No.: 08/997,861

[22] Filed: Dec. 24, 1997

[30] Foreign Application Priority Data

Dec. 26, 1996 [JP] Japan .................................. 8-348480

[51] Int. Cl.⁶ .................................................. F16L 25/00
[52] U.S. Cl. .............................. 285/328; 285/23; 285/45; 285/332.3
[58] Field of Search .............................. 285/328, 332.3, 285/332, 276, 23, 45; 251/216

[56] References Cited

U.S. PATENT DOCUMENTS

| | | | |
|---|---|---|---|
| 3,552,421 | 1/1971 | Yocum | 251/216 X |
| 4,458,926 | 7/1984 | Williamson | 285/332.3 |
| 5,120,084 | 6/1992 | Hasimoto | 285/332 X |
| 5,401,065 | 3/1995 | Okumura et al. | 285/328 |
| 5,720,505 | 2/1998 | Ohmi et al. | 285/328 |

*Primary Examiner*—Dave W. Arola
*Attorney, Agent, or Firm*—Flynn, Thiel, Boutell & Tanis, P.C.

[57] ABSTRACT

When first and second coupling pieces are tightened in the axial direction thereof by turning a screw member, the second coupling piece is prevented from being turned together with the screw member, thereby enhancing sealing property, cleanliness and workability. A thrust bearing is interposed between a pressing surface of the screw member and the second coupling piece.

9 Claims, 3 Drawing Sheets

COUPLING FOR USE WITH CONTAINER VALVE

BACKGROUND OF THE INVENTION

1. Field of the Invention

The present invention relates to couplings for connecting between pipes and container valves comprising a first piece provided on the container valve and having a seal surface and a screw portion, a second piece having a seal surface, a screw member which is screwed into the screw portion of the first piece and turned to press the seal surface of the second piece against the seal surface of the first piece so as to hermetically seal and connect the first and second pieces.

2. Prior Art

In an industrial field of semiconductors such as ICs and LSIs, the semiconductors are manufactured in a clean room excluding fine particles, and hence the environment and conditions for manufacturing the ICs, etc. are very severe. A special gas used in the manufacturing operation is introduced into a clean room through a pipe from the outside of the clean room, thereby preventing such special gas from mixing with other undesired molecules of gas such as air.

Accordingly, couplings for connecting between pipes and container valves as well as connecting between the pipes require very high accuracy thereof. Further, couplings for use in high pressure gas containers, etc. require complete sealing for safety reasons thereof.

Accordingly, to meet these requirements in the coupling for connecting between a pipe and a container valve, the JIS standard in Japan and the CGA (Compressed Gas Association) standard in has been set in the U.S.A.

A conventional coupling for connecting between a pipe and a container valve manufactured in accordance with the CGA standard is shown in FIG. 4.

In the same figure, denoted by 10 is a first coupling piece serving as one piece provided on the container valve (not shown), 20 is a second coupling piece (nipple) serving as another piece, and 30 is a nut member serving as a screw member.

The first coupling piece 10 includes a screw member 11 (a female screw portion 11 in FIG. 4) integrally formed therein, and a seal surface 15 formed at the innermost part thereof, namely, at the portion located inwardly of inner than the female screw member 11. The seal surface 15 is formed as a tapered hole so as to be brought into contact with a seal surface 25 of the second coupling piece 20.

The second coupling piece 20 includes a retaining portion 21 and the seal surface 25 is formed on this retaining portion 21. The seal surface 25 is formed as a tapered outer peripheral surface of the retaining portion 21. The second coupling piece 20 is hermetically attached to a pipe 2.

The screw or nut member 30 includes a male screw portion 31, which is formed on the outer peripheral surface at the tip end thereof and screwed into the female screw portion 11 of the first coupling piece 10 and turnable relative to the female screw portion 11, and a through hole 32 which is provided on the inner peripheral surface and the second coupling piece 20 can be engaged in the through hole 32 and movable along the axial direction of the through hole 32. The nut member 30 has a pressure surface 33 which is formed at the tip end surface thereof and is capable of pressing a rear end 23 of the retaining portion 21 of the second coupling piece 20.

The first coupling piece 10, the second coupling piece 20 and the nut member 30 are respectively made of metal such as stainless steel and brass.

When the male screw portion 31 of the nut member 30 at the side of the second coupling piece 20 is turned while it is screwed into the female screw portion 11 of the first coupling piece 10, the pressure surface 33 presses the second coupling piece 20 against the first coupling piece 10 so that both seal surfaces 15 and 25 are pressed against and brought into contact with each other. As a result, the first and second coupling pieces 10 and second coupling piece 20 are sealed hermetically and connected with each other.

There is a likelihood of occurrence of a case in the coupling for connecting between a pipe and a container valve that the second coupling piece 20 is turned together with the nut member 30 when the nut member 30 is turned to tighten the first and second coupling pieces 10 and 20 along the axial direction thereof so that the seal surface 25 is turned while it is brought into contact with the seal surface 15.

If such a case occurs, the seal surfaces 15 and 25 are liable to be scratched, and when such scratched first and second coupling pieces 10 and 20 are repeatedly used, there is a possibility of impairment of the sealing property and of leakage of gas such as poisonous gas in the pipe. Further, when the metallic seal surfaces 15 and 25 are scratched relative to each other, there is a possibility of generation of particles and of entrance of these particles into the pipe. Still further, when the first and second coupling pieces 10 and 20 which are scratched on their seal surfaces 15 and 25 are recycled, it is necessary to tighten the nut member 30 stronger to prevent the leakage of gas, thereby reducing the workability.

Even if the first piece is formed of the second coupling piece 20 or the second piece is formed of the first coupling piece 10, the same problems occur.

SUMMARY OF THE INVENTION

It is an object of the invention to provide couplings for connecting between pipes and container valves capable of preventing a second piece from being turned together with a screw member when the screw member is tuned to tighten the first and second pieces in the axial direction thereof, thereby enhancing sealing property, cleanliness and workability.

To achieve the above object, the coupling for connecting between a pipe and a container valve of the present invention comprises a first piece provided on the container valve having a seal surface and a screw portion, a second piece having a seal surface, a screw member which is screwed into the screw portion of the first piece and turned to press the seal surface of the second piece against the seal surface of the first piece so as to hermetically seal and connect the first and second pieces, wherein the coupling further comprises a thrust bearing interposed between a pressing surface of the screw member and the second piece.

According to the coupling for connecting between a pipe and a container valve having the construction set forth above, even if the first and second coupling pieces are tightened in the axial direction thereof by turning the screw member, the second coupling piece is not turned together with the screw member. Accordingly, there does not occur a case where the seal surfaces of the first and second coupling pieces are scratched and damaged to generate particles. Further, even if the first and second coupling pieces are repeatedly used, it is not necessary to increase the tightening torque since each seal surface is not damaged. Accordingly, it is possible to enhance the sealing property, cleanliness and workability.

PREFERRED EMBODIMENT OF THE INVENTION

Figure 3:
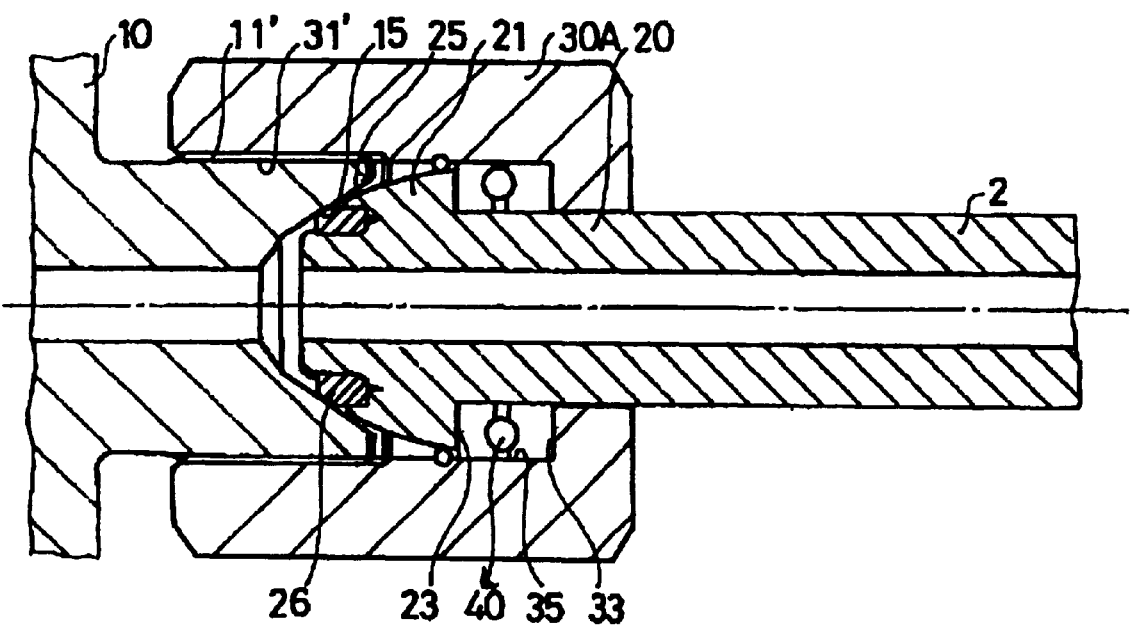
FIG. 3 is a view for explaining the coupling for connecting between a pipe and a container valve having a screw member formed of a box nut.
Figure 4:
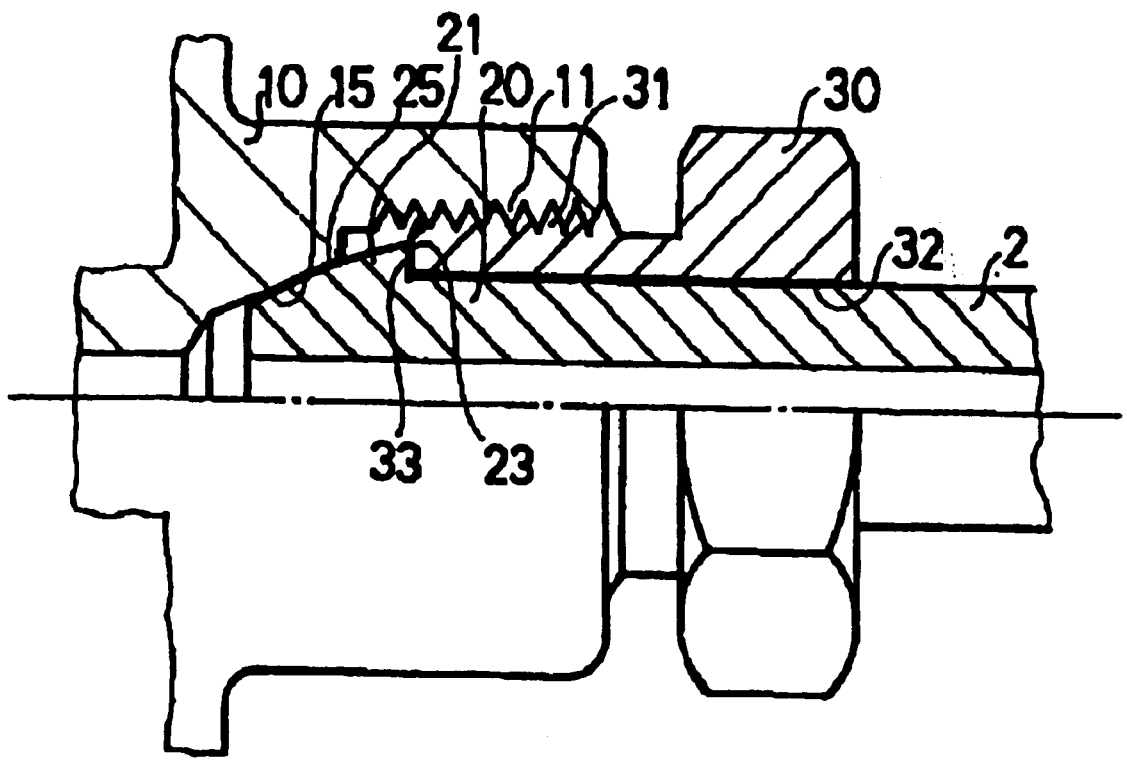
FIG. 4 is a view for explaining a conventional coupling for connecting between a pipe and a container valve.

Couplings for connecting between pipes and container valves according to a preferred embodiment of the present invention will be now described with reference to FIGS. 1 to 3. A basic construction of the coupling of the present invention is in principle the same as that of the conventional coupling as illustrated in FIG. 4, and hence components of the coupling are denoted by the same numerals as those of the conventional coupling, and the explanation thereof is omitted.

A thrust bearing 40, commonly known as an antifriction bearing or a rolling contact bearing, is interposed between the pressure surface 33 of the nut member 30 serving as a screw member and the second coupling piece 20 so as to prevent the second coupling piece 20 from being turned together with the nut member 30 when the nut member 30 is turned to tighten the first and second coupling pieces 10 and 20 in the axial direction thereof.

The first piece provided on the container valve is formed of the coupling piece 10. The second piece hermetically attached to the pipe 2 is formed of the second coupling piece (nipple) 20.

A ring-shaped elastic member 26 is mounted on the seal surface 25 of the second coupling piece 20 so as to contact the seal surface 15 of the first coupling piece 10. The elastic member 26 is formed of an elastic material such as Teflon (Trademark) or Diflon (Trademark).

The thrust bearing 40 is mounted in a ring-shaped recessed portion 35 which is bored in the pressure surface 33 of the nut member 30.

Figure 1:
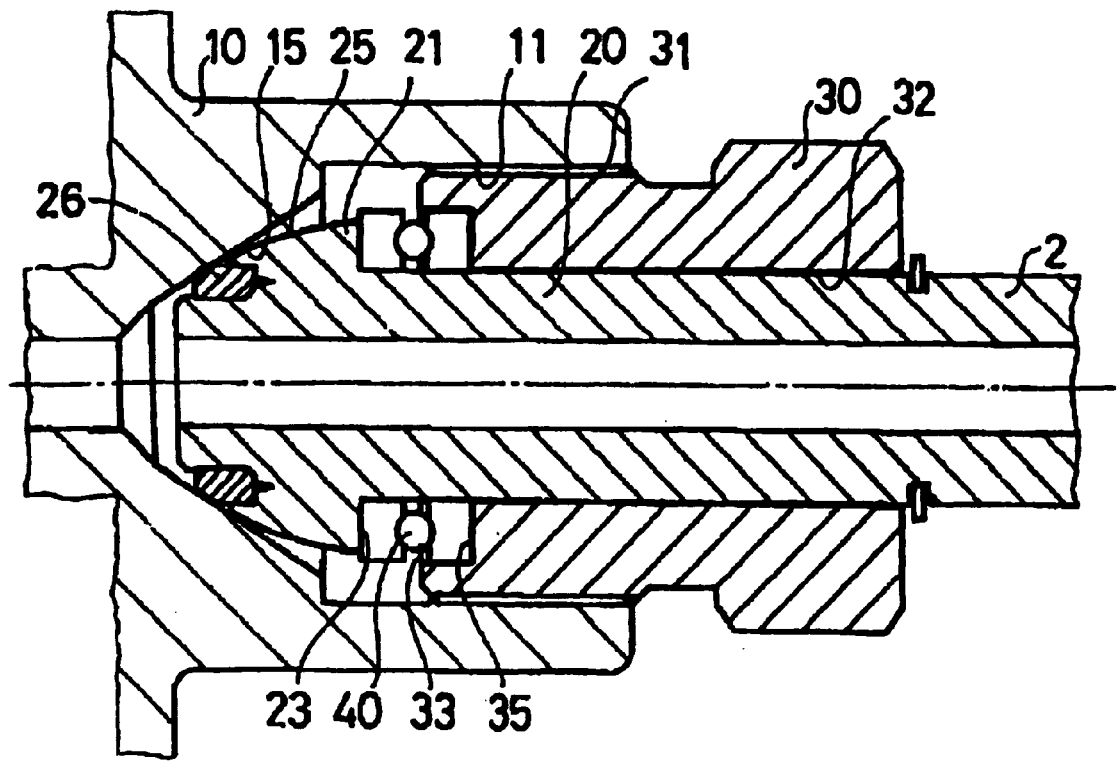
FIG. 1 is a view for explaining a coupling for connecting between a pipe and a container valve according to a preferred embodiment of the invention.
Figure 2:
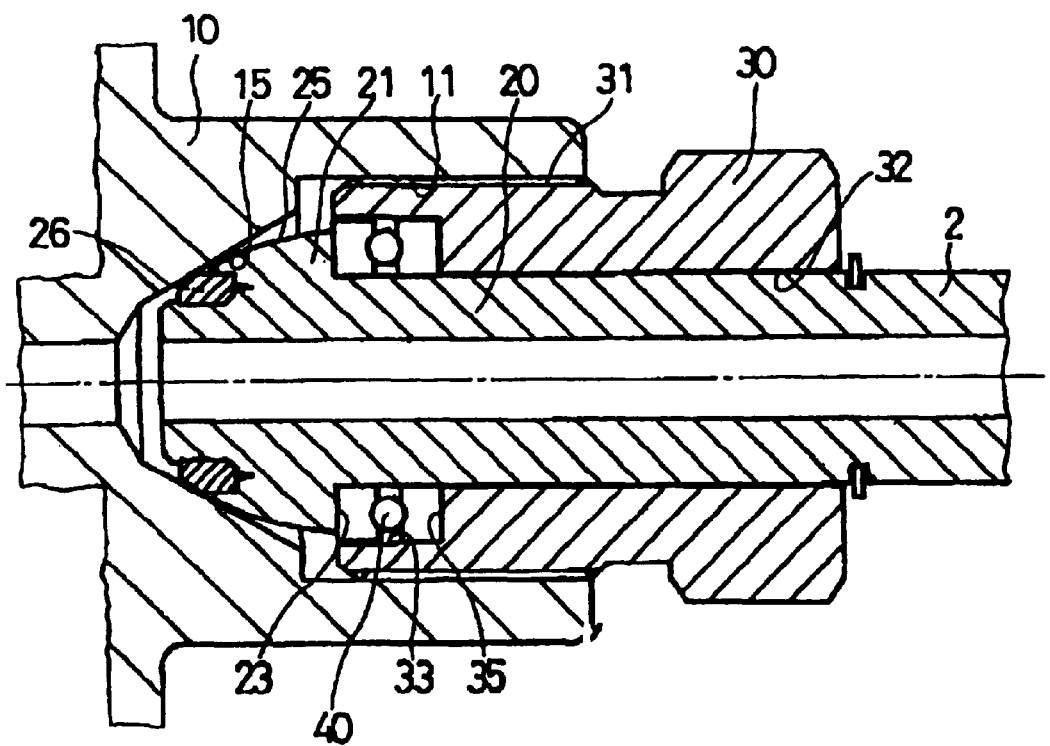
FIG. 2 is a view for explaining a coupling for connecting between a pipe and a container valve according to a modification of the invention.

Provided that a smooth turning of the nut member 30 is secured, the thrust bearing 40 may be mounted in the recessed portion 35 while it is partly engaged therein as shown in FIG. 1 or entirely engaged therein as shown in FIG. 2. A friction force generated between the nut member 30 and the second coupling piece 20 is remarkably reduced compared with that generated in the conventional coupling as shown in FIG. 4 owing to the thrust bearing 40 interposed between the pressure surface 33 of the nut member 30 and the rear end 23 of the retaining portion 21 of the second coupling piece 20. Accordingly, turning of the second coupling piece 20 with the nut member 30 is avoided.

In the coupling for connecting between a pipe and a container valve having the construction set forth above, even if the first and second coupling pieces 10 and 20 are tightened in the axial direction thereof by turning the nut member 30, the second coupling piece 20 is not turned together with the nut member 30. Further, since the elastic member 26 mounted on the seal surface 25 of the second coupling piece 20 is brought into contact with the seal surface 15 of the first coupling piece 10, there does not occur a case that the seal surfaces 15 and 25 of the first and second coupling pieces 10 and 20 are scratched and damaged to generate particles. Further, even if the first and second coupling pieces 10 and 20 are repeatedly used, it is not necessary to increase a tightening torque since each seal surface is not damaged. Accordingly, it is possible to enhance sealing property, cleanliness and workability.

Although the coupling according to the preferred embodiment set forth above includes the screw member formed of the nut member 30, the screw member may be formed of a box or cap nut member 30A. In this case, the screw portion of the first coupling piece 10 is formed of a male screw portion 11' which threadingly engages with a female screw portion 31' of the box nut member 30A.

Even in the coupling for connecting between a pipe and a container valve having such a modified construction, if the thrust bearing 40 is interposed between the pressure surface 33 of the box nut member 30A and the rear end 23 of the retaining portion 21 of the second coupling piece 20, it is possible to prevent the second coupling piece 20 from being turned together with the box nut member 30A, thereby enhancing sealing property, cleanliness and workability.

Further, although the first piece is formed of the first coupling piece 10 and the second piece is formed of second coupling piece (nipple) 20, it is needless to say that they may be provided vice versa, namely the first piece may be formed of the second coupling piece 20 and the second piece is formed of the first coupling piece 10.

According to the present invention, since the thrust bearing is interposed between the pressing surface of the screw or nut member and the second piece, it is possible to prevent the second piece from being turned together with the screw or nut member when the first and second pieces are tightened relative to each other in the axial direction when the screw member is turned. Accordingly, it is possible to enhance sealing property, cleanliness and workability. Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A coupling defining a longitudinal axis, said coupling comprising:

a first coupling member having a central bore, a threaded portion and an opening communicating with said bore, said opening being defined at least in part by an inner annular wall surrounding the axis and forming a frustoconical female sealing surface;

a second coupling member fixed to a pipe member at a terminal end thereof and extending into said opening, said second coupling member having a central bore coaxial with said bore of said first coupling member and defining a frustoconical male sealing surface, and a shoulder extending transversely relative to the axis;

an annular member disposed in surrounding and relatively rotatable relation with said second coupling member and having a threaded part threadingly engaged with said threaded portion of said first coupling member, and an end face extending transversely relative to the axis and disposed opposite said shoulder;

an elastomeric ring-shaped member mounted on one of said sealing surfaces for contact with the other said sealing surface to prevent abrasion of said sealing surfaces; and an antifriction thrust bearing disposed between and contacting said shoulder and said end face, said annular member being rotatable to transmit an axially-directed force to said shoulder of said second coupling member via said antifriction thrust bearing to sealingly engage said male sealing surface with said female sealing surface and create a hermetic seal between said first and second coupling members, said antifriction thrust bearing permitting said second coupling member to remain non-rotatable relative to said first coupling member during rotation of said annular member.

2. The coupling of claim 1 wherein said second coupling member is an integral and monolithic component of the pipe member.

3. The coupling of claim 1 wherein said male and female sealing surfaces are the sole sealing surfaces for sealing between said first coupling member and the pipe member.

4. The coupling of claim 1 wherein said thrust bearing is mounted in a ring-shaped recess formed in said end face.

5. The coupling of claim 1 wherein said annular member is an open-ended nut member having said threaded part formed externally thereon.

6. The coupling of claim 1 wherein said annular member is an open-ended cap nut having said threaded part formed internally thereon.

7. The coupling of claim 1 wherein said inner annular wall is a first annular wall, said opening is further defined by a second inner annular wall surrounding the axis and disposed axially adjacent said first annular wall, said second annular wall including said threaded portion of said first coupling member and having a substantially constant diameter greater than a largest diameter of said female sealing surface to provide said opening with an axially stepped configuration, said threaded part of said annular member being formed on an outer generally cylindrical surface thereof axially adjacent said antifriction thrust bearing.

8. The coupling of claim 1 wherein said threaded portion of said first coupling member is formed on an outer generally cylindrical surface thereof, and said threaded part of said annular member is formed on an inner generally cylindrical surface thereof.

9. The coupling of claim 1 wherein said first coupling member is provided on a container valve for connection to the pipe member.

* * * * *